J. C. BOHMKER.
COLTER.
APPLICATION FILED JULY 17, 1916.
1,208,463.
Patented Dec. 12, 1916.
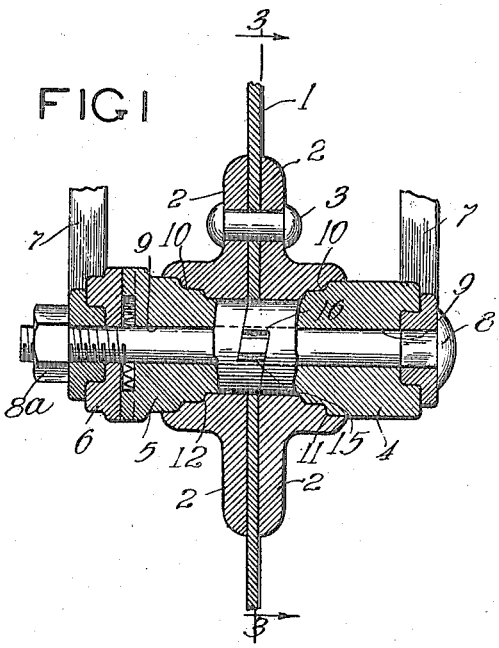
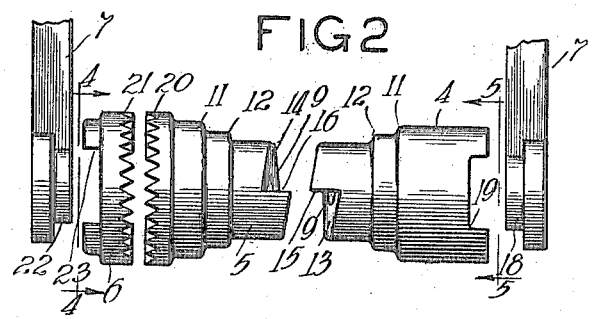
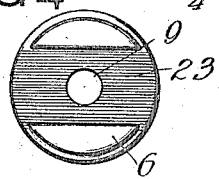
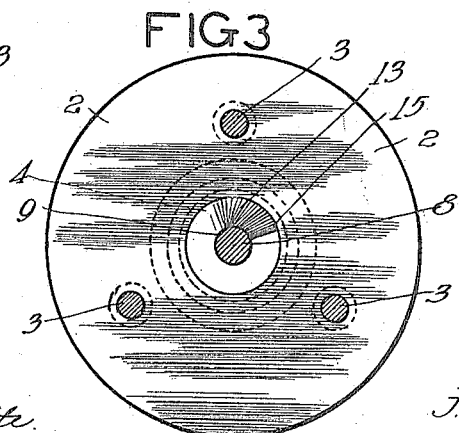
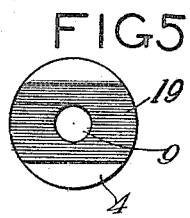
Witnesses:
Harry R. L. White.
W. P. Kilroy
Inventor:
J. C. Bohmker.
By Miller Chindahl Parker
Attys.

UNITED STATES PATENT OFFICE.

JOHN C. BOHMKER, OF BRADLEY, ILLINOIS, ASSIGNOR TO SEARS, ROEBUCK AND COMPANY, OF CHICAGO, ILLINOIS, A CORPORATION OF NEW YORK.

COLTER.

1,208,463.

Specification of Letters Patent.

Patented Dec. 12, 1916.

Application filed July 17, 1916. Serial No. 109,761.

*To all whom it may concern:*

Be it known that I, JOHN C. BOHMKER, a citizen of the United States, residing at Bradley, in the county of Kankakee and State of Illinois, have invented certain new and useful Improvements in Colters, of which the following is a specification.

This invention relates to colters and its object is to provide an improved adjustable bearing to take up between the bearing surfaces the wear occasioned by use.

A colter usually comprises a blade mounted for rotation upon supporting members carried by the plow. Herein I have shown the blade rigidly secured to a hub mounted on a pivot or in bearings, the pivot or bearings being suitably supported by the plow. In this invention I have provided the colter with a bearing which is adjustable for the wear occurring between the bearing surfaces.

In the accompanying drawings, Figure 1 is a sectional view of an embodiment of my invention. Fig. 2 is a view of the parts shown in Fig. 1 with the clamping bolt, colter blade and hub removed. Fig. 3 is a sectional view taken on line 3—3 of Fig. 1. Fig. 4 is an end view of the pivot taken along the line 4—4 of Fig. 2. Fig. 5 is a similar view taken along the line 5—5 of Fig. 2.

In Fig. 1, the colter blade 1 is rigidly secured to the hub members 2 by suitable means such as the rivets 3. The blade and hub members are rotatably supported by a pivot comprising the shouldered members 4 and 5 and a clutch member 6. The pivot is attached to the plow by the members 7. The members comprising the pivot and the supporting members 7 are held together in any suitable manner. Herein I have shown the members secured by a bolt 8 passing through the registering central openings 9 and threaded into a nut 8ª.

The hub members 2 and the pivot members 4 and 5 have a suitable number of coöperating shoulders as 10, 11 and 12. These shoulders provide the bearing surfaces between the hub and the pivot. Since the bearing surfaces in contact wear with use, the two pivot members are made adjustable with relation to each other to take up wear. The adjacent ends of the pivot members 4 and 5 have contacting spiral surfaces 13 and 14, respectively, best seen in Figs. 1 and 2, terminating in the high points 15 and 16, respectively. The pivot members 4 and 5 are rotatable relatively to each other. When the high points 15 and 16 are arranged as shown in Fig. 1, the shoulders 11 and 12 are nearer each other than when said high points are on top of each other. In Fig. 1 the pivot members are in such a position that but little adjustability remains in the bearing.

The pivot member 4 is coupled to one of the supporting members 7 and to prevent rotation of the member it is connected by a rib 18 and groove 19. The pivot member 5 is provided with a series of teeth 20 which are adapted to interlock with the teeth 21 on the clutch member 6. The clutch member in turn is similarly coupled to the other supporting member by a rib 22 and a groove 23.

The colter blade is permitted to rotate on the pivot members 4 and 5 without any play by tightening the bolt-and-nut connection through the supporting and pivot members. When through use, or otherwise, the bearing members become slightly worn and the rotation of the blade is affected by the play so formed, the play may be eliminated in the following manner: The bolt-and-nut connection is loosened until the teeth 21 can be withdrawn entirely from the teeth 20. The member 5 may thereupon be slightly rotated until the teeth 20 are advanced one or more teeth in the correct direction and the shoulders 11—12 will then approach each other. The bolt-and-nut connection is then tightened. In this manner the wear between the hub and the pivot members can be taken up and the play between these members and the hub will be reduced to a minimum.

From the foregoing it will be apparent that many modifications of my invention are possible. The members 4 and 6, may, for example, be made integral with the supporting members 7 or otherwise suitably secured against rotation. The hub also may be carried by the pivot members in such a manner that the hub is a pivot member mounted in the bearings. In this construction the coöperating shoulders would be on the outer surface of the hub. Furthermore, any suitable coöperating bearing surfaces may be substituted for the shoulders. Any suitable means may also be substituted for the interlocking teeth, provided, however, that relative rotation may be had, when desired, between the members 4 and 5.

It is seen that I have provided a colter with an adjustable bearing of rigid construction which, by eliminating unnecessary friction and permitting the oiling of the bearing, provides for the best condition of rotation for the blade.

I claim as my invention:

1. A colter having, in combination, a colter blade, a hub for said blade having shoulders thereon, means for rotatably supporting said hub comprising members having shoulders adapted to coöperate with said first mentioned shoulders and having contacting spiral end surfaces, and means for holding one of said hub supporting members in adjustable relation with another hub supporting member.

2. A colter having, in combination, a colter blade, a hub for said blade, means for rotatably supporting said hub comprising members having contacting spiral end surfaces, a clutch member having a serrated surface thereon adapted to engage a complementary surface at the opposite end of one of said supporting members, and means for securing said members together.

3. A colter having, in combination, a colter blade, a hub for the colter blade, means for rotatably supporting said hub comprising members having contacting spiral end surfaces and means for holding one of said hub supporting members in adjustable relation with another hub supporting member.

4. A colter having, in combination, a colter blade, a hub therefor, supporting members, a clutch member secured to one of said supporting members, a pivot member secured to another of said supporting members, a second pivot member adapted for rotation with respect to said clutch and said first mentioned pivot member, and means for securing said members together.

5. A bearing having, in combination, adjustable pivot members, supporting members having a rib-and-groove connection with said pivot members and means for securing all of said members together.

6. A bearing having, in combination, adjustable bearing means, a clutch member adapted to disengageably secure one of said bearing means against rotation, supporting means adapted to secure another of said bearing means and said clutch member against rotation, and means for securing said member and all of said means together.

7. A bearing having, in combination, two bearing members having spiral surfaces on their adjacent ends, a clutch member adapted to disengageably secure one of said members, and means for securing said members together.

8. A bearing having, in combination, two adjustable pivot members having spiral surfaces on their adjacent ends and means for adjustably securing said members together.

9. A bearing having, in combination, two bearing members having an adjustable spiral connection, and means for securing said members together.

In testimony whereof, I have hereunto set my hand.

JOHN C. BOHMKER.

Copies of this patent may be obtained for five cents each, by addressing the "Commissioner of Patents, Washington, D. C."